(12) United States Patent
Kim et al.

(10) Patent No.: US 9,065,708 B2
(45) Date of Patent: Jun. 23, 2015

(54) APPARATUS AND METHOD OF TRANSMITTING PREAMBLE HAVING ADDITIONAL INFORMATION IN DIFFERENTIAL MODULATION PACKET DATA COMMUNICATION

(75) Inventors: Seung Geun Kim, Daejeon (KR); Sea Moon Kim, Daejeon (KR); Sung Hoon Byun, Daejeon (KR); Jong Won Park, Daejeon (KR); Yong Kon Lim, Daejeon (KR); Chang Ho Yun, Busan (KR)

(73) Assignee: KOREA OCEAN RESEARCH AND DEVELOPMENT INSTITUTE, Ansan-Si (KR)

( * ) Notice: Subject to any disclaimer, the term of this patent is extended or adjusted under 35 U.S.C. 154(b) by 219 days.

(21) Appl. No.: 13/278,988

(22) Filed: Oct. 21, 2011

(65) Prior Publication Data

US 2012/0300793 A1 Nov. 29, 2012

(30) Foreign Application Priority Data

Apr. 28, 2011 (KR) ........................ 10-2011-0040368

(51) Int. Cl.
*H04L 27/20* (2006.01)
(52) U.S. Cl.
CPC .................................. *H04L 27/2075* (2013.01)
(58) Field of Classification Search
CPC ............. H04B 10/556; H04B 10/5561; H04B 10/5563; H04B 10/677; H04B 10/612; H04B 10/548

USPC .......................................................... 370/476
See application file for complete search history.

(56) References Cited

U.S. PATENT DOCUMENTS

| 2003/0058952 | A1* | 3/2003 | Webster et al. ................ 375/260 |
| 2010/0008216 | A1* | 1/2010 | Li et al. ......................... 370/208 |
| 2010/0091673 | A1* | 4/2010 | Sawai et al. .................... 370/252 |
| 2010/0240411 | A1* | 9/2010 | Dick et al. .................. 455/550.1 |

* cited by examiner

*Primary Examiner* — Omar Ghowrwal
*Assistant Examiner* — Ellen A Kirillova
(74) *Attorney, Agent, or Firm* — Lexyoume IP Meister, PLLC

(57) ABSTRACT

Apparatus and method of transmitting a preamble having additional information in differential modulation packet data communication. The apparatus includes a phase rotator that outputs a phase rotation quantity corresponding to additional information to be applied to a transmission target packet, a transmission-multiplier that multiplies the phase rotation quantity output from the phase rotator by a preamble to be transmitted, a symbol mapper that converts header and payload data to be applied to the transmission target packet into symbols and outputs the same, a multiplexer that processes an output signal of the transmission-multiplier and an output signal of the symbol mapper to be selectively output through an output end to form a symbol stream in units of packets, and a differential symbol converter that converts the symbol stream output from the multiplexer according to a predetermined differential modulation method and outputs the converted symbol stream.

11 Claims, 3 Drawing Sheets

APPARATUS AND METHOD OF TRANSMITTING PREAMBLE HAVING ADDITIONAL INFORMATION IN DIFFERENTIAL MODULATION PACKET DATA COMMUNICATION

BACKGROUND OF THE INVENTION

1. Field of the Invention

The present invention relates to an apparatus and method of transmitting a preamble having additional information in differential modulation packet data communication. More particularly, the present invention relates to an apparatus and method of transmitting a preamble having additional information in differential modulation packet data communication, in which the preamble is phase-rotated so as to correspond to the additional information and detected, thereby determining the information added to a packet.

2. Description of Related Art

In digital data communication, a packet data communication method is generally used, in which long length data is divided into data having a predetermined length, information necessary for data exchange is added to the divided data to form packet data, and the packet data is transmitted.

The packet is converted into symbol streams to then be transmitted through physical channels. The symbol streams transmitted through physical channels are largely divided into a preamble symbol stream and a packet data symbol stream. The preamble symbol stream is a predetermined symbol stream to be transmitted to a receiver to be used for synchronization information extraction and channel distortion compensation to allow the receiver to receive proper data. The packet data symbol stream is a symbol stream transmitted from a transmission apparatus 10 after mapping packet data including a packet header and a payload into a transmitted symbol.

The packet header is a part of transmitting data including additional data concerning use of a packet to be transmitted, information for transmitting data to a correct destination, and network controlling, etc. The packet payload is a part of transmitting data including actually transmitted information in a packet.

Differential modulation is used to transmit data in a physical layer in digital communication. In the differential modulation, an n-th transmitted symbol is determined by performing an operation on an (n−1)-th symbol and a symbol corresponding to n-th digital data to be currently transmitted. That is to say, in the differential modulation, the information in the n-th transmitted symbol is transmitted along with a difference between the n-th symbol and the (n−1)-th symbol. General differential modulation techniques include differential phase shift keying (DPSK) modulation, and [pi]/4 differential quadrature phase shift keying ([π]/4-DQPSK) modulation. In the general differential modulation, it is not necessary for a receiver to restore a reference phase of a received signal, thereby simplifying a configuration of the receiver.

However, in the conventional differential modulation based packet data communication, a preamble is simply used in transmitting a predetermined symbol stream to be used for synchronization information extraction and channel distortion compensation.

SUMMARY OF THE INVENTION

In order to overcome the above-mentioned shortcomings, the present invention provides an apparatus and method of transmitting a preamble having additional information by applying the additional information to the preamble in differential modulation packet data communication.

According to an aspect of the invention, there is provided an apparatus of transmitting a preamble having additional information in differential modulation packet data communication, the apparatus including a phase rotator that outputs a phase rotation quantity corresponding to additional information to be applied to a transmission target packet, a transmission-multiplier that multiplies the phase rotation quantity output from the phase rotator by a preamble to be transmitted, a symbol mapper that converts header and payload data to be applied to the transmission target packet into symbols and outputs the same, a multiplexer that processes an output signal of the transmission-multiplier and an output signal of the symbol mapper to be selectively output through an output end to form a symbol stream in units of packets, and a differential symbol converter that converts the symbol stream output from the multiplexer according to a predetermined differential modulation method and outputs the converted symbol stream.

The additional information may include at least one selected from packet type information, packet generation method information, and packet length information.

Here, the packet type information may include information concerning notification of data transmission, acknowledgement of data reception, a request for channel reservation, and channel reservation request confirmation.

According to another aspect of the invention, there is provided a method of transmitting a preamble having additional information in differential modulation packet data communication, the method including determining additional information to be applied to a transmission target packet; determining a phase rotation quantity corresponding to the additional information determined in the additional information determining step; multiplying the phase rotation quantity determined in the phase rotation quantity determining step by a preamble of the transmission target packet; coupling header and payload data to the preamble, differentially modulating and transmitting the preamble coupled to the header and payload data.

Here, the phase rotation quantity may be determined such that the preamble of the packet belongs to a set of signals based on the differential modulation used and a multiplication result of the preamble of the packet with the phase rotation quantity belongs to the set of signals based on the differential modulation used.

In the apparatus and method of transmitting a preamble having additional information in differential modulation packet data communication according to the present invention, a predetermined preamble based on the packet type is phase-rotated so as to correspond to the additional information to then be transmitted. Alternatively, in cases of different packet generation methods or packet lengths, since the preamble with information concerning packet generation methods or packet lengths can be transmitted, a transmission rate of data that can be effectively transmitted can be increased.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Hereinafter, embodiments of the present invention will be described in detail with reference to the accompanying drawings.

Figure 1:
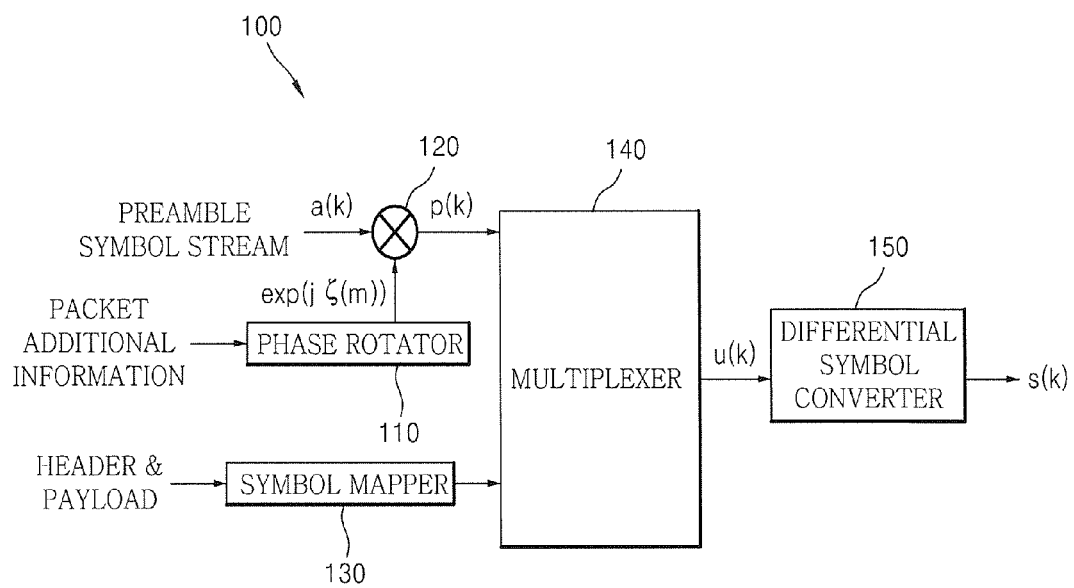
FIG. 1 is a block diagram of an apparatus of transmitting a preamble according to the present invention.

FIG. 1 is a block diagram of an apparatus of transmitting a preamble according to the present invention.

Referring to FIG. 1, the preamble transmitting apparatus 100 includes a phase rotator 110, a transmission-multiplier 120, a symbol mapper 130, a multiplexer 140 and a differential symbol converter 150.

The phase rotator 110 outputs a phase rotation quantity $\exp(j \cdot \xi(m))$ corresponding to additional information to be applied to a preamble a(k) of a transmission target packet from a preamble symbol stream of the packet.

The transmission-multiplier 120 multiplies the phase rotation quantity $\exp(j \cdot \xi(m))$ output from the phase rotator 110 by the preamble a(k)) to be transmitted and outputs a phase-rotated symbol stream p(k).

The symbol mapper 130 converts header and payload data to be applied to the transmission target packet into symbols and outputs the same.

The multiplexer 140 processes an output signal of the transmission-multiplier 120 and an output signal of the symbol mapper 130 to be selectively output through an output end to form a symbol stream in units of packets.

The differential symbol converter 150 converts the symbol stream output from the multiplexer 140 according to a predetermined differential modulation method and outputs the converted symbol stream.

Hereinafter, a method of transmitting additional information by phase-shifting a preamble of a packet in differential modulation packet data communication will be described in more detail.

In the illustrated embodiment, the transmitting method will be described with regard to [pi]/4 differential quadrature phase shift keying ([π]/4-DQPSK) modulation by way of example, but is not limited thereto. The present invention can also be applied to differential modulation such as differential phase shift keying (DPSK).

Figure 2:
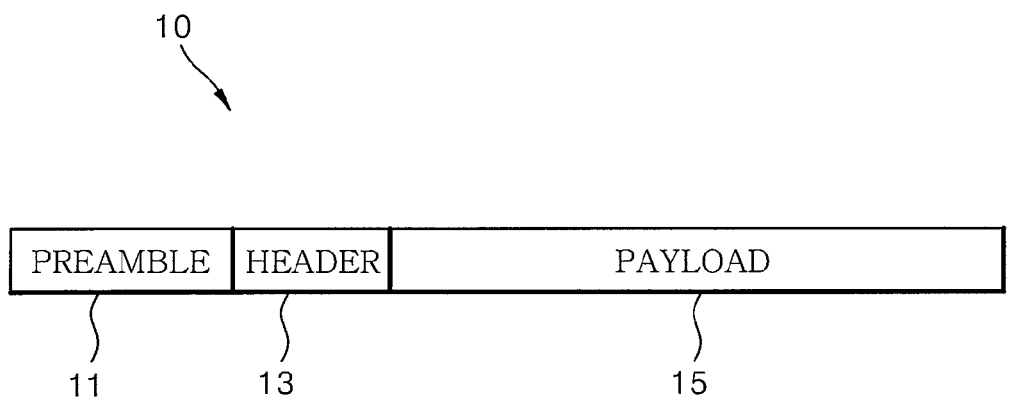
FIG. 2 is a diagram illustrating a structure of a packet to which the present invention is applied.

First, a packet structure in packet data communication will be briefly described. A packet 10 transmitted through a physical channel is largely divided into a preamble, a header and a payload, as shown in FIG. 2.

The preamble 11 is a part for transmitting predefined data between the transmission apparatus 100 and a receiver. In order to allow the receiver to restore packet data successfully, the preamble 11 is used for signal processing algorithms to be used for synchronization restoration, channel distortion compensation, packet starting part detection. The header 13 is a part including additional information concerning use and destination of the packet 10 to be transmitted, and network control. The payload 15 is a part for transmitting data including actually transmitted information.

In the π/4-DQPSK modulation, phase-shifted signals proportional to a phase difference corresponding to input data are transmitted by alternately using two QPSK signal sets having phase transitions of 45 degrees.

Figure 3:
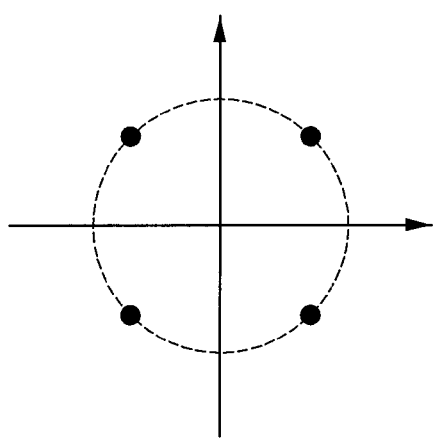
FIGS. 3 and 4 are constellation diagrams of [pi]/4-DQPSK signals for explaining differential modulation used in the present invention.
Figure 4:
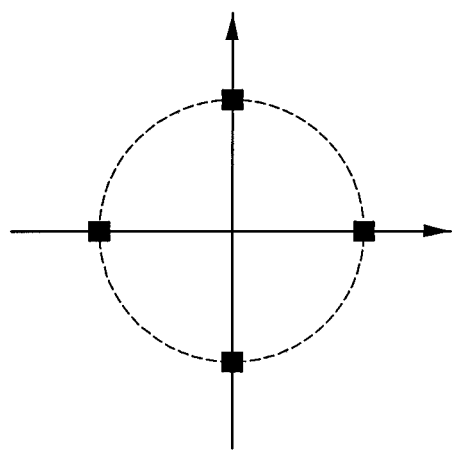

That is to say, in the π/4-DQPSK modulation, one symbol belonging to a set of QPSK signals marked by circles (●) in the constellation diagram of FIG. 3 is transmitted in an odd-numbered symbol period, and one symbol belonging to a set of QPSK signals marked by rectangles (■) in the constellation diagram of FIG. 4, which are respectively shifted by 45 degrees, compared to the QPSK signals shown in FIG. 3, is transmitted in an even-numbered symbol period.

As represented by Equation (1), k-th and (k+1)-th transmitted symbols are converted into differential symbols. In the following description, it is assumed that a Gray mapping technique is employed, but other mapping techniques may also be used.

$$s(k) = s(k-1) \cdot u(k) \quad (1)$$

wherein $u(k) = \exp(j \cdot \theta(k))$, $s(0) = 1$, and a phase) ($\theta(k)$) of the k-th transmitted signal has one value selected from the following four possible symbol phase values, that is, $$\theta(k) \in \left\{ \frac{\pi}{4}, \frac{3\pi}{4}, -\frac{3\pi}{4}, -\frac{\pi}{4} \right\}.$$

The phase of the k-th transmitted signal depending on input binary data is mapped by, for example, Gray mapping, using combinations of input data bits, and the results thereof are shown in Table 1.

TABLE 1

| I-channel data | Q-channel data | θ(k) |
| --- | --- | --- |
| 0 | 0 | π/4 |
| 0 | 1 | −π/4 |
| 1 | 0 | 3π/4 |
| 1 | 1 | −3π/4 |

It is assumed that a first bit of two input data bits is used as I-channel data and a second bit is used as Q-channel data. Here, mapping techniques of the I-channel data and the Q-channel data may be exchanged.

In the present invention, a preamble symbol stream of a packet is denoted by {A}, and a k-th symbol of {A} is denoted by a(k). As described above, in order to allow the receiver to restore packet data successfully, a(k) is a predefined symbol stream in conformity with signal processing algorithms to be used for synchronization restoration, channel distortion compensation, packet starting part detection.

The phase of a(k) has one value selected from $$\left\{ \frac{\pi}{4}, \frac{3\pi}{4}, -\frac{3\pi}{4}, -\frac{\pi}{4} \right\},$$

like $\theta(k)$. In the present invention, a preamble symbol stream is phase-rotated for each packet to modulate the preamble, thereby transmitting additional information. First, the transmission apparatus 100 applies as inputs additional information of a packet to be additionally transmitted and an intrinsic preamble symbol stream a(k). The phase rotator 110 determines a predetermined phase rotation quantity $\zeta(m)$, according to the additional information of the m-th input packet and outputs a phase rotation quantity $\exp(j \cdot \xi(m))$ to phase-rotate the preamble symbol stream by the phase rotation quantity $\zeta(m)$. The intrinsic preamble signal stream a(k) is multiplied by the output of the phase rotator 110 to then output a symbol p(k) obtained by phase-rotating the preamble. The symbol p(k) may be used for a preamble part of the packet.

$$p(k) = a(k) \cdot \exp(j \zeta(m)) \quad (2)$$

wherein p(k) is a symbol transmitted in a preamble symbol period, and $$\{p(k) = \exp(j \cdot \theta(k)) \mid \theta(k) \in \{\frac{\pi}{4}, \frac{3\pi}{4}, -\frac{3\pi}{4}, -\frac{\pi}{4}\}\}.$$

The thus formed preamble is coupled with a header and a payload and is processed by differential modulation to then be transmitted.

As described above, when a preamble of a packet is phase-rotated by packet additional information, a phase-rotated preamble symbol p(k) should belong to the set of input signals based on the differential modulation used.

That is to say, the phase rotation quantity is determined such that the preamble of a packet belongs to a set of signals based on the differential modulation used and a multiplication result of the preamble of the packet with the phase rotation quantity also belongs to the set of signals based on the differential modulation used.

In the π/4 DQPSK modulation used as an exemplary differential modulation method, the phase rotation quantity ζ(m) has one value selected from $$\{0, \frac{\pi}{2}, \pi, -\frac{\pi}{2}\},$$

and one of the four phase values is selected and transmitted for each packet, 2-bit additional information is transmitted.

In addition, the header and payload data of a packet are converted into modulated symbols by the symbol mapper 130. In a case where Gray mapping is employed in the π/4 DQPSK modulation according to the present invention, the symbol mapper 130 receives the header and payload data of a packet as 2-bit data, and maps the phase, as shown in Table 1, to then output the k-th symbol.

The multiplexer 140 receives as inputs an output signal p(k) of the transmission-multiplier 120 and an output signal of the symbol mapper 130, outputs the output signal p(k) of the transmission-multiplier 120 corresponding to a preamble length and then outputs a symbol input from the output signal of the symbol mapper 130, to form a symbol stream for transmitting a packet. An output signal u(k) output through the output end of the multiplexer 140, corresponding to the k-th transmitted symbol, is converted by the differential symbol converter 150 according to the differential modulation as represented by Equation (1) to then output a symbol to be transmitted in the k-th transmitted symbol period. The output of the differential symbol converter 150 is band-limited using a pulse-shaping filter and is modulated into a carrier band to then be transmitted.

In the illustrated embodiment, the π/4 DQPSK modulation is used. Thus, there are four possibilities $$\{0, \frac{\pi}{2}, \pi, -\frac{\pi}{2}\}$$

as the phase rotation quantity ζ(m) according to the packet type. Therefore, 2-bit data can be additionally provided for each packet without varying the length of a transmitted packet.

The multiplexer 140 receives as inputs an output signal p(k) of the transmission-multiplier 120 and an output signal of the symbol mapper 130, outputs the output signal p(k) of the transmission-multiplier 120 corresponding to a preamble length and then outputs a symbol input from the output signal of the symbol mapper 130, to form a symbol stream for transmitting a packet. An output signal u(k) output through the output end of the multiplexer 140, corresponding to the k-th transmitted symbol, is converted by the differential symbol converter 150 according to the differential modulation as represented by Equation (1) to then output a symbol to be transmitted in the k-th transmitted symbol period. The output of the differential symbol converter 150 is band-limited and modulated into a carrier band to then be transmitted.

In the illustrated embodiment, the 7/4 DQPSK modulation is used. Thus, there are four possibilities $$\{0, \frac{\pi}{2}, \pi, -\frac{\pi}{2}\}$$

as the phase rotation quantity ζ(m) according to the packet type. Therefore, 2-bit data can be additionally provided for each packet without varying lengths of transmitted packet.

As an application example of additional information added to a preamble, packet additional information for changing the phase of a packet preamble symbol may be used as packet type information. In packet data communication, packets are used in various types of uses, and examples thereof include a packet for use in transmitting data according to a protocol used, a packet for use in acknowledging whether a data packet is received by a receiver side, a packet for use in confirming whether there is a channel reservation request, a packet for use in confirming a channel reservation request. Conventionally, information concerning the packet type is recorded in a packet header, which has a fixed length long enough to specify a packet type for every packet.

In the present invention, when a preamble is phase-rotated to be used to specify a packet type, there are four possible packet types in the π/4 DQPSK modulation. If less than four packet types are required for upper layers a portion specifying the packet type may be removed from the packet header. If more than four packet types are required for upper layers, a data size of the portion specifying the packet type may be reduced by 2 bits. That is to say, when packets of the same length are used in packet data communication by reducing the length of data in the packet header required for specifying packet type, the transmission rate of effectively transmitted data can be increased. In addition, when there are four or less packet types, information concerning the packet type required in a network layer can be obtained by detecting packet synchronization of a physical layer, and the portion specifying the packet type can be controlled by the packet header.

As another application example of additional information added to a preamble, the additional information added to a preamble may be used to indicate information concerning channel codes used when different channel encoders are used for respective packets or punctured channel codes having different coding rates even if the same channel encoder is used, when the transmission apparatus 100 performs modulation for transmitting the payload and/or header of a packet. In addition, the additional information added to a preamble may also be used to notify the receiver of information concerning packet lengths when packets have different lengths.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. An apparatus of transmitting additional information to a preamble of a packet in differential modulation packet data communication, the apparatus comprising:
   a phase rotator that outputs a phase rotation quantity corresponding to additional information to be applied to a transmission target packet;
   a transmission-multiplier that multiplies the phase rotation quantity output from the phase rotator by a preamble to be transmitted;
   a symbol mapper that converts header and payload data to be applied to the transmission target packet into symbols and outputs the same;
   a multiplexer that processes an output signal of the transmission-multiplier and an output signal of the symbol mapper to be selectively output through an output end to form a symbol stream in units of packets; and
   a differential symbol converter that converts the symbol stream output from the multiplexer according to a predetermined differential modulation method and outputs the converted symbol stream,
   wherein the phase rotator selects one phase rotation quantity corresponding to the additional information to be applied to the transmission target packet among four different phase values and outputs the selected phase rotation quantity, and thereby 2-bit additional information is loaded on the preamble.

2. The apparatus of claim 1, wherein the additional information includes each of packet type information, packet generation method information, and packet length information.

3. The apparatus of claim 2, wherein the packet type information includes information concerning notification of data transmission, acknowledgement of data reception, a request for channel reservation, and channel reservation request confirmation.

4. The apparatus of claim 2, wherein the packet generation method information includes information concerning channel codes used when different channel encoders are used for respective packets or punctured channel codes having different coding rates even if the same channel encoder is used.

5. The apparatus of claim 2, wherein length information of the packet includes information concerning packet lengths when packets have different lengths.

6. A method of transmitting additional information to a preamble of a packet in differential modulation packet data communication, the method comprising:
   determining additional information to be applied to a transmission target packet;
   determining a phase rotation quantity corresponding to the additional information determined in the additional information determining step;
   multiplying the phase rotation quantity determined in the phase rotation quantity determining step by a preamble of the transmission target packet;
   coupling header and payload data to the preamble that is multiplied by the phase rotation quantity, differentially modulating and transmitting the preamble coupled to the header and payload data,
   wherein, in determining the phase rotation quantity, the phase rotation quantity is selected among four different phase values to correspond to the additional information to be applied to the transmission target packet, thereby 2-bit additional information being loaded on the preamble by multiplying the phase rotation quantity by the preamble.

7. The method of claim 6, wherein the phase rotation quantity is determined such that the preamble of the packet belongs to a set of signals based on the differential modulation used and a multiplication result of the preamble of the packet with the phase rotation quantity belongs to the set of signals based on the differential modulation used.

8. The method of claim 6, wherein the additional information includes each of packet type information, packet generation method information, and packet length information.

9. The method of claim 8, wherein the packet type information includes information concerning notification of data transmission, acknowledgement of data reception, a request for channel reservation, and channel reservation request confirmation.

10. The method of claim 8, wherein the packet generation method information includes information concerning channel codes used when different channel encoders are used for respective packets or punctured channel codes having different coding rates even if the same channel encoder is used.

11. The method of claim 8, wherein length information of the packet includes information concerning packet lengths when packets have different lengths.

* * * * *